J. C. OLLARD.
LOGGING BLOCK BEARING.
APPLICATION FILED FEB. 8, 1917.
1,251,686.
Patented Jan. 1, 1918.
2 SHEETS—SHEET 1.
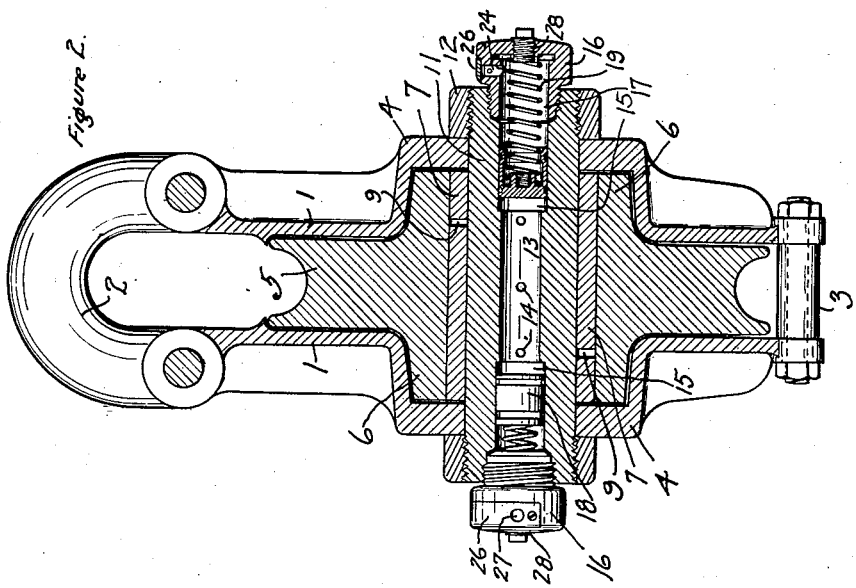
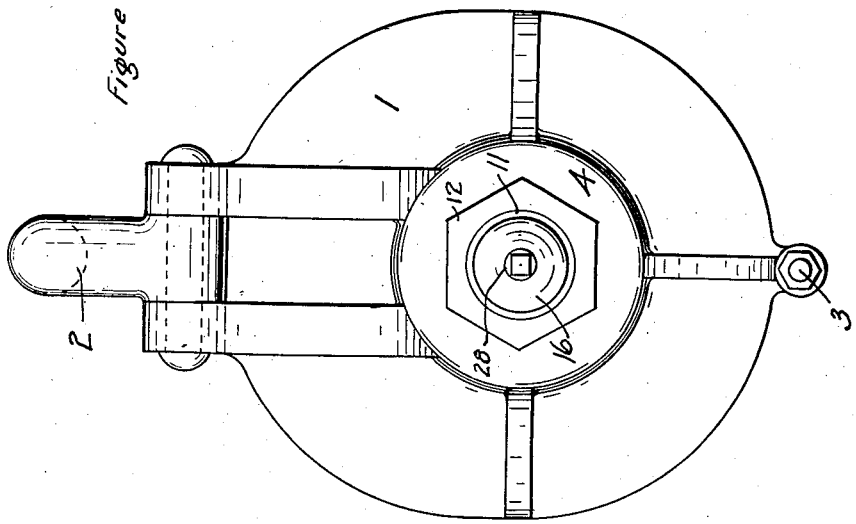
Inventor
James C. Ollard
By T. D. Elliott
Attorney

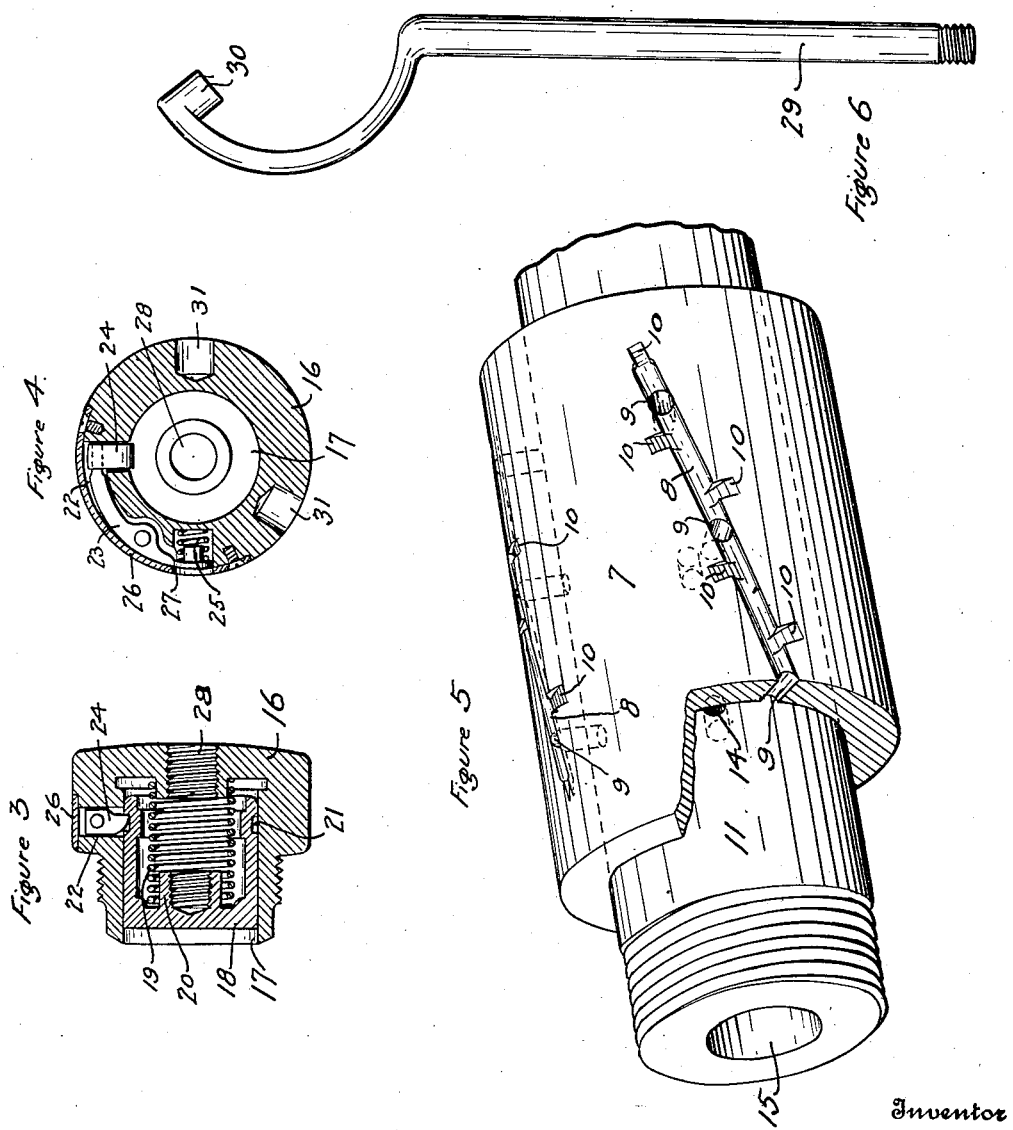

UNITED STATES PATENT OFFICE.

JAMES C. OLLARD, OF TACOMA, WASHINGTON, ASSIGNOR TO OLLARD TROLLEY WHEEL COMPANY, OF DOVER, DELAWARE.

LOGGING-BLOCK BEARING.

1,251,686. Specification of Letters Patent. Patented Jan. 1, 1918.

Application filed February 8, 1917. Serial No. 147,361.

*To all whom it may concern:*

Be it known that I, JAMES C. OLLARD, a citizen of the United States, residing at Tacoma, in the county of Pierce, State of Washington, have invented certain new and useful Improvements in Logging-Block Bearings, of which the following is a specification.

This invention relates to bearings and especially to those for logging blocks or for other devices requiring bearings adapted to stand hard usage and heavy strains such as are incident to logging operations.

The objects of the invention are to provide a fixed bearing pin of great strength and effectually protected from dirt and grit; to provide a means whereby the life of the pin and the sheave is materially extended; to provide a loose bushing between the pin and the sheave; to provide automatic oiling means for both surfaces of the bushing; to provide means for forcing the lubricant through the ducts; to provide means to prevent the waste of said lubricant when the block is not in use; and to provide a complete block which will be simple, effective and of great wearing ability.

I attain these and other objects by the devices, mechanisms and arrangements illustrated in the accompanying drawings, in which—

Figure 1 is a side elevation of a logging block equipped with my improved bearing;

Fig. 2 is a cross-section thereof;

Fig. 3 is a section of the removable cap with the piston locked therein;

Fig. 4 is a cross-section thereof showing the piston locking means;

Fig. 5 is a perspective view of the hollow pin and its bushing, a portion of the bushing being broken away to reveal the pin therein; and Fig. 6 is an elevation of the tool for withdrawing the pistons and for removing the caps.

Similar numerals of reference refer to similar parts throughout the several views.

The pulley block consists of two side plates 1 secured together at their upper end by a link 2 adapted to be engaged by a cable, chain, or other fastening means, and at their lower end by a suitable bolt 3. Each plate 1 has a hollow boss 4 formed at it's center. The sheave 5 fits between the plates 1 and has an outward extending boss 6 on each side, fitting into the hollow cavity formed by the bosses 4 of the plates 1. The sheave 5 has a large central hole therethrough, adapted to fit over the bushing 7. This bushing 7 is made of hardened steel or other suitable material of like wearing quality and has four slightly spiral grooves 8 formed in its outer surface with several holes 9 passing through it and communicating with each of said grooves 8. The grooves 8 may also have short circumferential grooves 10 leading therefrom as shown. The bushing 7 extends entirely through the sheave 5 from end to end of the bosses 6 thereof. A fixed pin 11 is mounted in the two side plates 1 of the pulley block, and has nuts 12 screwed on its two ends and engaging the outer surfaces of the bosses 4 of the plates 1. A central hole passes through the pin 11 from end to end, the central portion 13 of which is smaller in diameter than the other portions and is positioned directly in line with the rope groove of the sheave 5. This part 13 has a plurality of holes 14 passing through it and adapted to communicate with the holes 9 in the bushing 7 as they move therepast. On each end of the part 13 the said hole is of larger diameter and is adapted to form grease reservoirs 15 communicating with the said central part 13. The outer ends of the reservoirs 15 are further enlarged and screw-threaded to receive the removable caps 16. Each such cap 16 screws into said enlarged opening and has a central cavity 17 therein of the same diameter as the reservoirs 15. A piston 18 fits in each reservoir 15, or cavity 17, and is pressed toward the part 13 by the spring 19 mounted between the said piston and the cap 16, as shown. The piston 18 cannot pass beyond the shoulder formed between the parts 13 and 15. The piston 18 has a central lug 20 on its rear side, said lug having a screw-threaded hole therein but not passing through said piston. A groove 21 is formed around the piston 18 close to its rear edge. The cap 16 has a cavity 22 (Fig. 4) formed in its outer surface and a lever 23 is mounted therein, one end of said lever having a tooth 24 extending inward through a hole in the cap and adapted to engage the said groove 21 in the piston 18 to hold said piston within the cap 16, against the action of the spring 19, when it is thus withdrawn into the cap. The other end of the lever 23 is pressed outward by means of a spring 25. A plate 26 covers the cavity 22 and a hole 27 therein allows access to the end of the lever 23 adjacent said spring 25, so that by pressing the lever 23, through the hole 27, the tooth 24 is removed from the groove 21 and the piston is unlocked and released and is pressed toward the center of the pin 11 by the spring 19. A plugged hole 28 is provided through the outer wall of the cap 16.

A tool (Fig. 6) having a shank 29 adapted to pass through the hole 28 and having the end of said shank threaded to enter the hole in the lug 20 of the piston 18, is provided; the other end of said tool being curved to fit over the cap 16 and having a lug 30 adapted to enter suitable holes 31 in said cap 16 whereby said cap, together with the piston previously locked therein as above, may be removed from the end of the hole 15 in the pin to open access to the reservoir.

Referring particularly to the central pin 11 as shown in Fig. 2, it will be seen that it is supported at each end by the end walls of the bosses 4 and that the sheave and its bosses extend over the entire distance between the inner surfaces of said walls. It will also be remembered that the strain is applied in the rope groove of the sheave and is transferred through the pin to the side plates; this distribution causes a bending strain on the pin, the load being applied to its center. By leaving the central part 13 of the hole through the pin smaller in diameter it is evident that the resulting form is of the most economical practical shape to withstand the bending strain thereon. Further it will be observed that the sheave is substantially inclosed by the plates 1 and that there is no central opening through which dirt and grit would have access to the bearings, hence the bearings require a much smaller quantity of lubricant than is required by other blocks not so well protected. This tends to increase the life of the bearing but the main reason for the long life of this bearing is found in the hardened steel bushing which is interposed between the fixed pin and the sheave and which is free to rotate independently. The lubricant within the reservoirs 13 and 15, being under pressure from the springs 19, is constantly fed through the holes 14 and oils the surfaces of the pin and bushing, and some of said lubricant is taken up by the holes 9 in the bushing and is fed thereby to the grooves 8 and thus thoroughly lubricates the wearing surfaces of the bushing and sheave. When the block is not in use the end 29 of the tool is passed through the cap and screwed into the piston and said piston is pulled back into the cap and is locked therein by the tooth 24 until the block is to be used, thus preventing the waste of the lubricant. As the lubricant in the parts 15 is used, the pistons 18 approach the part 13 and when they reach the shoulder the said part 13 holds a reserve of lubricant which is fed to the bearing as needed without being forced by the spring pressure thus materially reducing the danger of the bearing running dry.

Having described my invention, what I claim is:

1. In a device of the class described, the combination with a pair of side plates and a sheave mounted between them; of a pin passing through the sheave and secured to said side plates and having an oil reservoir therein, said reservoir being of smaller diameter under the center of the sheave; oil passages leading from the small central reservoir to the outer surface of the pin to lubricate the sheave; and spring pressed pistons in the outer larger oil reservoirs and acting inward toward the center whereby the oil in said reservoirs is placed under pressure to lubricate the sheave.

2. In a device of the class described, the combination with a pair of side plates and a sheave mounted between them; of a pin passing through the sheave and secured to said side plates and having an oil reservoir therein, said reservoir being of smaller diameter under the center of the sheave; a hardened bushing interposed between the pin and the sheave and free to rotate therebetween independently; oil passages leading from the small central reservoir to the outer surface of the pin to lubricate the bushing; oil passages in said bushing and adapted to pick up lubricant from said first passages and to deliver it to the sheave; and spring pressed pistons in the outer larger oil reservoirs and acting inward toward the center, whereby the oil in said reservoirs is placed under pressure to lubricate the bushing and sheave.

3. In a device of the class described, the combination with a pair of side plates and a sheave mounted between them; of a pin passing through the sheave and secured to said side plates and having an oil reservoir therein, said reservoir being of smaller diameter under the center of the sheave; oil passages leading from the small central reservoir to the outer surface of the pin to lubricate the sheave; a cap closing each end of said pin to close the reservoirs therein; a piston in each said larger outer reservoir; and a spring interposed between each such cap and piston to press the piston inward toward the center whereby the oil in said reservoirs is placed under pressure to lubricate the sheave.

4. In a device of the class described, the combination with a pair of side plates and a sheave mounted between them; of a pin passing through the sheave and secured to said side plates and having an oil reservoir therein, said reservoir being of smaller diameter under the center of the sheave affording two outer reservoirs and a smaller reservoir; oil passages leading from the small central reservoir to the outer surface of the pin to lubricate the sheave; caps closing the ends of said pin to close the reservoirs therein and each having a cavity of corresponding size with said adjacent reservoir and communicating freely therewith; a pair of pistons, each adapted to be housed within said cavity in the adjacent cap and to move therefrom into said outer reservoirs toward said central smaller reservoir; a spring interposed between each said cap and piston to press the piston, whereby the oil in said reservoirs is placed under pressure to lubricate the sheave; and means mounted in said caps to engage said pistons whereby said pistons may be releasably locked within said caps against the action of said springs.

5. In combination, a member having an axial opening, a cap on the end of said member and closing the opening therein, said cap having a cavity in register with the axial opening, a piston in the cavity of the cap, an expansible helical spring within said cavity and normally pressing the piston toward the axial opening in said member, and means mounted upon the cap to engage the piston and hold it within the cavity of the cap and adapted to be tripped to release the said piston.

JAMES C. OLLARD.